United States Patent
Choi

(10) Patent No.: US 9,992,173 B2
(45) Date of Patent: Jun. 5, 2018

(54) APPARATUS FOR AND METHOD OF PLAYING BACK CONTENT

(71) Applicant: SAMSUNG ELECTRONICS CO., LTD., Suwon-si, Gyeonggi-do (KR)

(72) Inventor: Ju-hyun Choi, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 40 days.

(21) Appl. No.: 14/868,552

(22) Filed: Sep. 29, 2015

(65) Prior Publication Data
US 2016/0112379 A1 Apr. 21, 2016

(30) Foreign Application Priority Data
Oct. 15, 2014 (KR) .................. 10-2014-0139072

(51) Int. Cl.
*H04L 29/06* (2006.01)
*H04N 21/266* (2011.01)
*H04N 21/4405* (2011.01)
*H04N 21/6377* (2011.01)
*H04N 21/835* (2011.01)

(52) U.S. Cl.
CPC ........ *H04L 63/0428* (2013.01); *H04L 63/062* (2013.01); *H04L 63/068* (2013.01); *H04N 21/26613* (2013.01); *H04N 21/4405* (2013.01); *H04N 21/6377* (2013.01); *H04N 21/835* (2013.01)

(58) Field of Classification Search
CPC . H04L 63/0428; H04L 63/062; H04L 63/068; H04L 9/0881; H04L 9/0838; H04N 21/26613; H04N 21/4405; H04N 21/6377; H04N 21/835
See application file for complete search history.

(56) References Cited

U.S. PATENT DOCUMENTS 6,839,837 B1 * 1/2005 Morishita ............. G06F 21/602
380/44
7,151,832 B1 * 12/2006 Fetkovich ............. G06F 21/606
348/E7.056

(Continued)

FOREIGN PATENT DOCUMENTS

| KR | 10-2007-0064081 | 6/2007 |
| KR | 10-2008-0001893 | 1/2008 |
| KR | 10-2010-0023624 | 3/2010 |

OTHER PUBLICATIONS

"Encrypted Media Extensions," W3C Editor's Draft Sep. 14, 2017, 82 pages, https://dvcs.w3.org/hg/html-media/raw-file/tip/encrypted-media/encrypted-media.html, downloaded Nov. 1, 2017.

*Primary Examiner* — Hadi S Armouche
*Assistant Examiner* — Sher A Khan
(74) *Attorney, Agent, or Firm* — Nixon & Vanderhye, P.C.

(57) ABSTRACT

A method of playing back streaming content includes decoding the content based on a first decryption circuit configured based on a first key and outputting the content; requesting a second key from a server; receiving the second key and configuring a second decryption circuit based on the second key; and decoding the content based on a second decryption circuit and outputting the content, wherein the decoding of the content based on the first decryption circuit and outputting the content is performed until the second decryption circuit is configured.

11 Claims, 8 Drawing Sheets

(56) References Cited

U.S. PATENT DOCUMENTS

| | | | | |
|---|---|---|---|---|
| 2004/0024688 A1* | 2/2004 | Bi | ............................ | G06F 21/10 |
| | | | | 705/37 |
| 2007/0076872 A1* | 4/2007 | Juneau | ................. | H04L 63/1408 |
| | | | | 380/202 |
| 2009/0217343 A1* | 8/2009 | Bellwood | ................ | G06F 21/10 |
| | | | | 726/1 |
| 2013/0067109 A1* | 3/2013 | Dong | ................... | H04L 65/4069 |
| | | | | 709/231 |
| 2013/0238896 A1* | 9/2013 | Pedlow, Jr. | ............. | G06F 21/10 |
| | | | | 713/156 |
| 2014/0013112 A1* | 1/2014 | Cidon | ................. | G06F 21/6218 |
| | | | | 713/165 |
| 2016/0139977 A1* | 5/2016 | Ashani | ................ | G06F 11/0706 |
| | | | | 714/26 |

* cited by examiner

APPARATUS FOR AND METHOD OF PLAYING BACK CONTENT

CROSS-REFERENCE TO RELATED APPLICATION

This application is based on and claims priority under 35 U.S.C. § 119 to Korean Patent Application No. 10-2014-0139072, filed on Oct. 15, 2014, in the Korean Intellectual Property Office, the disclosure of which is incorporated by reference herein in its entirety.

BACKGROUND

1. Field

The disclosure relates to an apparatus and method for content playback.

2. Description of Related Art

Along with the development of Internet technologies, streaming services that allow easy distribution of content have rapidly increased. Particularly, since the World Wide Web Consortium (W3C) has recently established a new specification Media Source Extension/Encrypted Media Extension (MSE/EME), techniques for providing content via web browsers have been spotlighted.

In terms of content services, content protection is one of the most important matters, and thus, determining how to protect content provided by streaming services via web browsers has been required.

In the related art, only a user authorized based on license data is allowed to decrypt encrypted data. However, since license data may be exposed or leaked to other users, a method to detect unauthorized content usage and a method of protecting content for handling unauthorized content usage are needed.

SUMMARY

According to an aspect of an example embodiment, a method of playing back contents provided as streams is provided, the method includes decoding the content using a first decrypter or decryption circuitry configured based on a first key and outputting the content; requesting a second key from a server; receiving the second key and configuring a second decrypter or decryption circuitry based on the second key; and decoding the content using the second decrypter and outputting the content, wherein the content is decoded using the first decrypter or decryption circuitry and output until the second decrypter or decryption circuitry is configured.

The method may further include detecting unauthorized usage of the content, wherein the requesting of the second key is performed when unauthorized usage of the content is detected.

In the detecting of the unauthorized usage of the content, it may be determined that an unauthorized usage of the content is detected when a usable space of a storage device is reduced more than a size of data received by a content playback device from a server.

Detecting the unauthorized usage of the content includes accumulating amounts of data received by the content playback device from the server.

In the detecting of the unauthorized usage of the content, it may be determined that an unauthorized usage of the content is detected when a usable space of a storage device is reduced more than a designated amount.

In the detecting of the unauthorized usage of the content, network traffic of data input to or output by the content playback device is measured and, if network traffic of data output by the content playback device is greater by a designated amount than network traffic of data input to the content playback device, it is determined that an unauthorized usage of the content is detected.

When the configuration of the second decrypter is completed, the first decrypter is unable to decode the content.

Decoding the content using the first decrypter, requesting of the first key to the server, receiving of the second key from the server, configuring of the second decrypter, and decoding of the content using the second decrypter are performed by a web browser.

According to an aspect of an example embodiment, a content playback device, which plays back contents provided as streams is provided. The content playback device includes a processor configured to decode the content using a first decrypter or decryption circuitry configured based on a first key and outputting the content, to request a second key from a server, to receive the second key to configure a second decrypter or decryption circuitry based on the second key, and to decode the content using the second decrypter or decryption circuitry; and an output device or circuitry configured to output the content, wherein the content is decoded using the first decrypter or decryption circuitry and output until the second decrypter or decryption circuitry is configured.

The processor includes detector configured to detect an unauthorized usage of content, and the second key is requested when the detector detects the unauthorized usage of the content.

The detector may be configured to determine that an unauthorized usage of the content is detected when a usable space of a storage device is reduced more than a size of data received by a content playback device from a server.

The detector may be configured to accumulate amounts of data received by the content playback device from the server.

It may be determined that an unauthorized usage of the content is detected when a usable space of a storage device is reduced more than a designated amount.

The detector may be configured to measure network traffic of data input to or output by the content playback device and, if network traffic of data output by the content playback device is greater by a designated amount than network traffic of data input to the content playback device, determines that an unauthorized usage of the content is detected.

When the configuration of the second decrypter or decryption circuitry is completed, the first decrypter is unable to decode the content.

The processor includes a demuxer, which requests the second key from the server using information including an address of the server and information regarding a digital rights management (DRM) type.

According to an aspect of an example embodiment, a non-transitory computer readable recording medium is provided having recorded thereon a computer program codes for implementing a method of playing back contents by being read out and executed by a processor, the method including decoding the content using a first decrypter or decryption circuitry configured based on a first key and outputting the content; requesting a second key from a server; receiving the second key and configuring a second decrypter or decryption circuitry based on the second key; and decoding the content using the second decrypter or decryption circuitry and outputting the content, wherein the content is decoded using the first decrypter or decryption circuitry and output until the second decrypter or decryption circuitry is configured.

BRIEF DESCRIPTION OF THE DRAWINGS

These and/or other aspects will become more apparent and more readily appreciated from the following detailed description, taken in conjunction with the accompanying drawings in which like reference numerals refer to like elements, and wherein.

DETAILED DESCRIPTION

Figure 1:
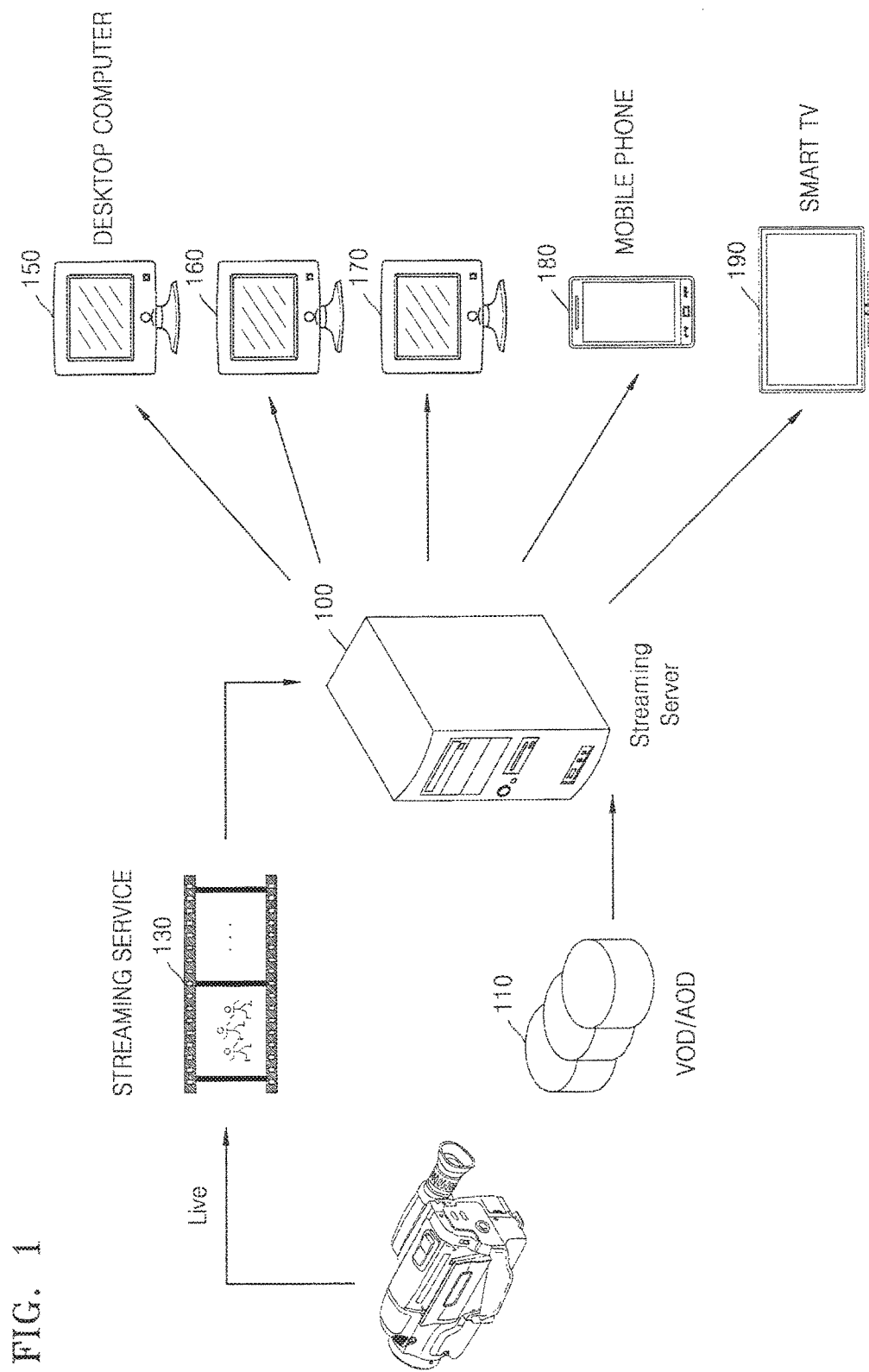
FIG. 1 is a diagram illustrating a general configuration of a streaming service for illustrating the principle of the streaming service.

Reference will now be made to example embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are described below, by referring to the figures, to illustrate certain example aspects.

In addition, although the terms used in the disclosure are selected from generally known and used terms, some of the terms mentioned in the description have been selected by the applicant at his or her discretion, the detailed meanings of which are described in relevant parts of the description herein.

In addition, unless explicitly described to the contrary, the word "comprise" and variations such as "comprises" or "comprising" will be understood to imply the inclusion of stated elements but not the exclusion of any other elements. In addition, the term "units" described in the specification mean units for processing at least one function and operation and can be implemented by software components, firmware components, electronic circuitry or hardware components, such as FPGA or ASIC. However, the "units" are not limited to software components or hardware components. The "units" may be embodied on a recording medium and may be configured to operate one or more processors. Therefore, for example, the "units" may include components, such as software components, object-oriented software components, class components, and task components, processes, functions, properties, procedures, subroutines, program code segments, drivers, firmware, micro codes, circuits, data, databases, data structures, tables, arrays, and variables. Components and functions provided in the "units" may be combined to smaller numbers of components and "units" or may be further divided into larger numbers of components and "units."

Example embodiments will now be described more fully with reference to the accompanying drawings, in which example embodiments are illustrated. In the description, certain detailed explanations of related art are omitted when it is deemed that they may unnecessarily obscure the description.

FIG. 1 is a diagram illustrating a general configuration of an example streaming service illustrating an example principle of the streaming service.

In the description, the term 'streaming' refers, for example, to a method of transmitting and playing back multimedia files, such as sounds and moving pictures, and may refer to a method of downloading and playing back files at the same time.

An example of streaming services may be a live streaming service 130 for transmitting recorded data to a content playback device of a user via a streaming server 100 and playing back the recorded data in real time.

Another example of streaming services may be a video-on-demand (VOD) service or an audio-on-demand (AOD) service for transmitting multimedia contents to a content playback device via the streaming server 100 and playing back the multimedia contents.

A content playback device may, for example, be any of desktop computers 150, 160, and 170, a mobile phone 180, a smart TV 190, a laptop computer, and a personal digital assistant (PDA) or may be any of various other multi-function display devices or entertainment devices.

Figure 2:
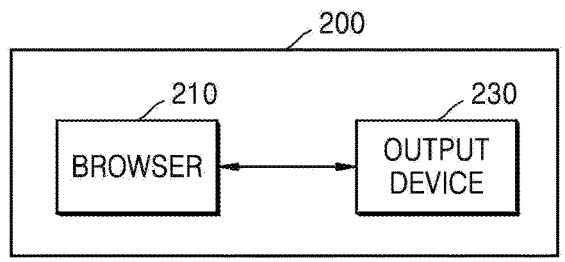
FIG. 2 is a block diagram illustrating a content playback device.

FIG. 2 is a block diagram illustrating an example content playback device 200.

The content playback device 200 may, for example, include a processor 210 and an output device 230.

The content playback device 200 which plays back content provided by streaming may obtain an authorization from a server via the processor 210, such as a web browser and may perform operations such as downloading contents and decrypting the contents.

To protect content, a server may store information regarding a key at a particular segment of the content and may allow only a user having a key authenticated by the server to decrypt the content using the corresponding key.

The processor 210 may be authenticated by a server, receive a first key, decrypt content by using a first decrypter or decryption circuitry configured based on the received first key, and output the decrypted content.

The processor 210 may also detect unauthorized usage of the content using various methods.

For example, if unauthorized usage of the content is detected, the processor 210 may be configured to request a second key from the server. When the second key is received, the processor 210 may be configured to configure a second decrypter or decryption circuitry based on the second key and to decrypt the content using the second decrypter or decryption circuitry.

When the second key is received from the server and the second decrypter is configured, it then becomes impossible to decrypt the content by using the first key and the first decrypter configured based on the first key.

The output device 230 may display the decrypted content. The output device 230 may communicate with an external device in various ways.

Although the processor 210 and the output device 230 are shown as separate components, the processor 210 and the output device 230 may be integrated with each other as a single component.

Furthermore, although the processor 210 and the output device 230 are shown as components adjacent to each other in the content playback device 200, it is not necessary for devices functioning as the processor 210 and the output device 230 to be physically adjacent to each other, and the processor 210 and the output device 230 may be apart from each other.

Furthermore, since the content playback device 200 is not limited to a physical device, some functions of the content playback device 200 may be embodied in the form of software.

The content playback device 200 may, for example, further include an input unit for receiving a user input.

The content playback device 200 may, for example, further include a storage unit for storing downloaded contents.

Figure 3:
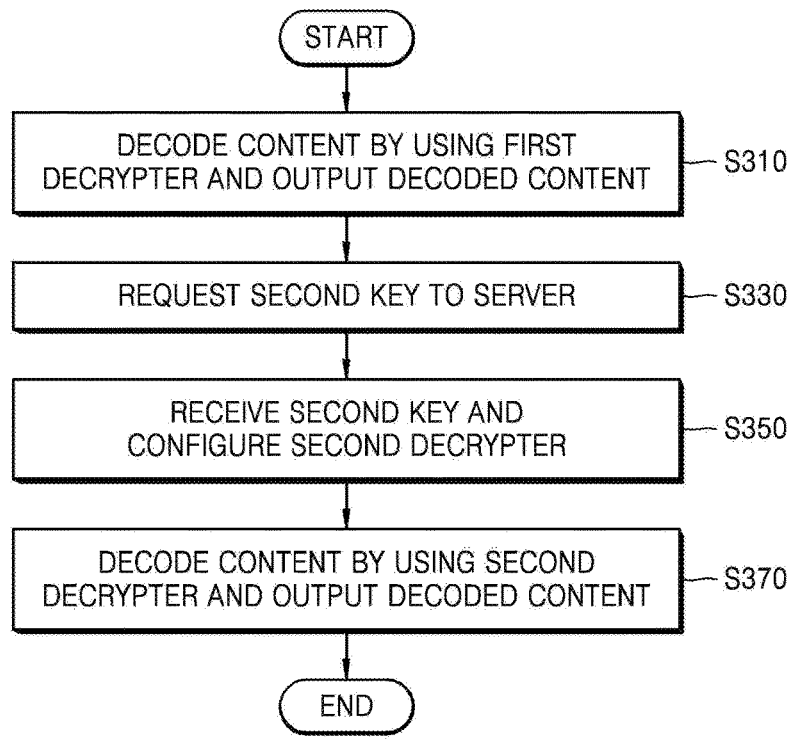
FIG. 3 is a flowchart illustrating a method for content playback.

FIG. 3 is a flowchart illustrating an example method of playing back content.

In operation S310, the content playback device 200 may decrypt content using a first decrypter or decryption circuitry configured based on a first key and output the decrypted content.

A server may, for example, transmit a key to an authenticated user or an authenticated playback device only.

The content playback device 200 may configure a first decrypter using a first key received from the server and data related to the first key. The first decrypter may be a hardware component, such as, for example, digital circuitry, or a software component. Since content received from the server is encrypted, it is necessary for the content playback device 200 to download the content and decrypt the content using the first decrypter to play back the content.

In an operation S330, the content playback device 200 may request a second key from the server.

If an unauthorized usage of the content is detected or a designated time period is elapsed from the reception of the first key, the content playback device 200 may request a second key from the server.

In an operation S350, the content playback device 200 may receive a second key from the server and configure a second decrypter or decryption circuitry based on the second key.

The content playback device 200 may subsequently deactivate the first key and the first decrypter and configure the second decrypter based on the second key received from the server and other data related to the second key. The second decrypter may be a hardware component, such as, for example, digital circuitry or a software component.

When the configuration of the second decrypter is completed, it then becomes impossible to decrypt the content using the first decrypter.

In an operation S370, the content playback device 200 may decrypt the content and output the decrypted content using the second decrypter.

The content playback device 200 may decrypt content received from the server based on the second decrypter and output the decrypted content.

The content playback device 200 may, for example, perform the operations S330 and S350 in the background even while the content playback device 200 is downloading and playing back particular contents. For example, even while the operations S330 and S350 are being performed, the content playback device 200 may continuously output content decrypted using the first decrypter and output the content decrypted by using the second decrypter from a point in time at which operation S350 is completed.

Therefore, the content playback device 200 may switch keys in the background, thereby being possible to obtain a new security system and seamlessly play back single content.

Figure 4:
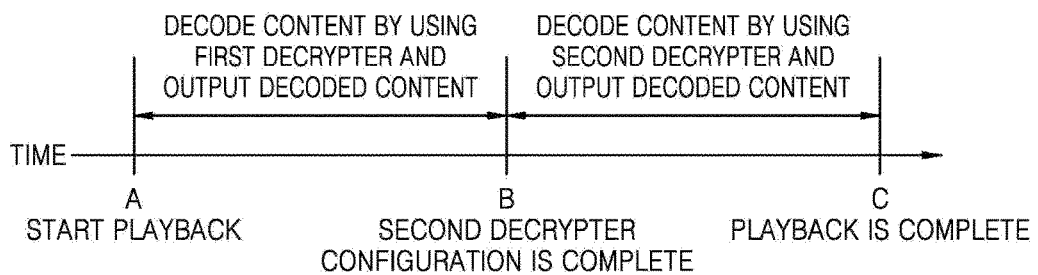
FIG. 4 is a diagram illustrating playback of content as a function of time.

FIG. 4 is a diagram illustrating example playback of content as a function of time.

At a time point A, the content playback device 200 may start decrypting content by using a first decrypter and outputting the decrypted content.

At a time point B, the content playback device 200 may complete configuring a second decrypter in, for example, the background.

From a time point B, the content playback device 200 may start decrypting the content by using the second decrypter and outputting the decrypted content.

Here, it is important to continue playback of the content seamlessly from the initiation of the playback of the content at the time point A to the completion of the playback of the content at the time point C.

When the configuration of the second decrypter is completed, the content playback device 200 may deactivate the first decrypter and the content decrypted using the first decrypter.

As a result, even if the content, which was previously decrypted using the first decrypter and played back, may only be re-decrypted using the second decrypter and played back after the configuration of the second decrypter is completed and it becomes impossible to play back the content without the second decrypter. For example, once a key is changed and a new decrypter is configured, it may be impossible to play back content, which was previously played back, without the corresponding decrypter.

Figure 5:
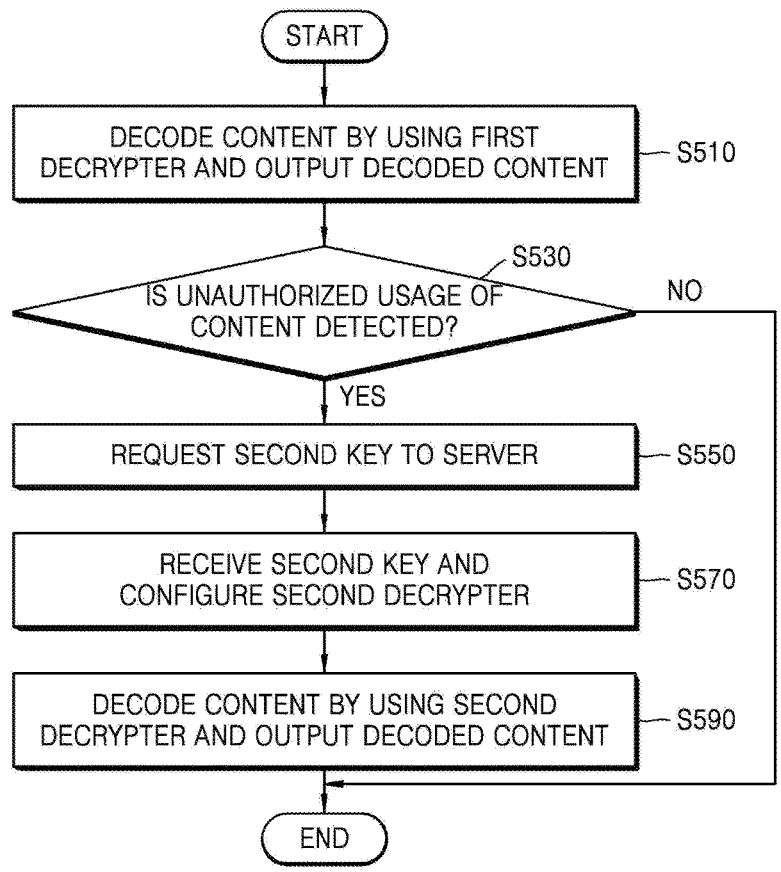
FIG. 5 is a flowchart illustrating a method of playing back contents.

FIG. 5 is a flowchart illustrating an example method of playing back contents.

In an operation S510, the content playback device 200 may decrypt content using a first decrypter configured based on a first key and output the decrypted content.

In an operation S530, the content playback device 200 may detect whether there is an unauthorized usage of the content.

An unauthorized usage of the content may refer to playback or downloading of the content without obtaining playback authorization rights from a server, for example.

Example descriptions of a method in which the content playback device 200 detects an unauthorized usage of content will be provided below with reference to FIGS. 7, 8, and 9.

If unauthorized usage of the content is detected, the content playback device 200 may request a second key from the server (operation S550).

To request a second key from the server, an address of the server being accessed, information regarding a digital rights management (DRM) type, and data for generating a key may be necessary.

In an operation S570, the content playback device 200 may receive a second key and configure a second decrypter.

In an operation S590, the content playback device 200 may decrypt the content using the second decrypter and output the decrypted content.

When the configuration of the second decrypter is completed, the content playback device 200 deactivates the first decrypter and the content decrypted using the first decrypter, thereby preventing any portion of the content from being played back without the second decrypter.

Figure 6:
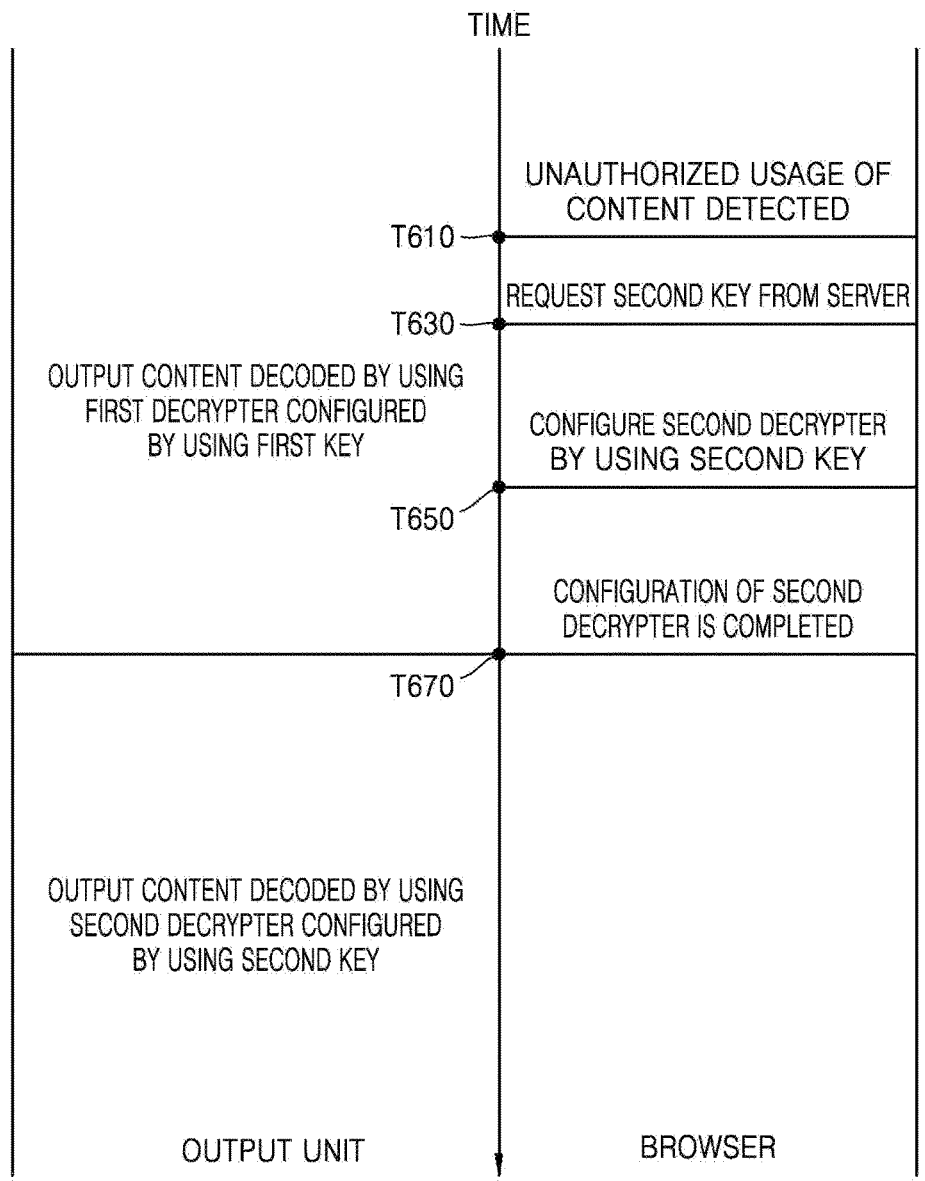
FIG. 6 is a diagram illustrating operations of an output device and a processor as a function of time.

FIG. 6 is a diagram illustrating example operations of an output device and a processor as a function of time.

While the output device is outputting content that is decrypted using a first decrypter configured based on a first key, the processor may detect an unauthorized usage of the content at a time point T610, request a second key from a server at a time point T630, and receive the second key and configure a second decrypter at a time point T650. When the configuration of the second decrypter is completed at a time point T670, the output device outputs the content that is decrypted using the second decrypter configured based on the second key.

Although the first decrypter is switched to the second decrypter at the time point T670, the content is output seamlessly.

Figure 7:
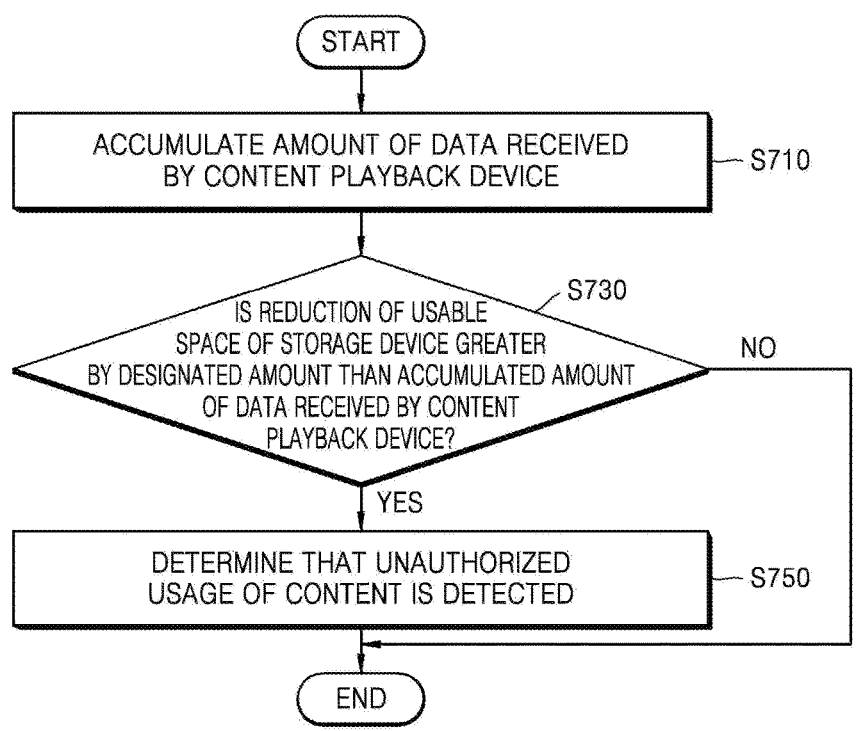
FIG. 7 is a flowchart illustrating a method of detecting unauthorized usage of content.

FIG. 7 is a flowchart illustrating an example method of detecting unauthorized usage of content.

In an operation S710, the content playback device 200 may receive content from a server and accumulate an amount of data received by the content playback device 200.

The amount of data received by the content playback device 200 may refer to an amount of data segments stored in the content playback device 200. The term 'data segment' may, for example, refer to a piece of data generated by compressing the data into an appropriate size for actual transmission of the data via a network.

In an operation S730, the content playback device 200 may determine whether a reduction of a usable space of a storage device is greater by a designated amount than an accumulated amount of data received by the content playback device 200.

The storage device may, for example, be a non-volatile memory, an internal memory, an external memory, or a combination thereof. For example, the storage device may be a non-volatile memory, such as a non-volatile random access memory (NVRAM), a flash memory, and a disk drive, or the like.

In an example in which data received by the content playback device 200 is stored in a storage device, usable space of the storage device should be reduced by size of the data received by the content playback device 200.

If a reduction of the usable space of the storage device is greater by a designated or predetermined amount than an accumulated amount of data received by the content playback device 200, the content playback device 200 may determine that unauthorized usage of the content is detected S750.

If a reduction of the usable space of the storage device is greater by a designated or predetermined amount than an accumulated amount of data received by the content playback device 200, a harmful program, such as, for example, a malicious code, may have been installed in the storage device instead of the content intended to be received from a server or the received content may have been copied in an abnormal way.

However, even if a reduction of the usable space of the storage device is greater by a designated amount than an accumulated amount of data received by the content playback device 200, no unauthorized usage of content may have occurred.

Even in this case, the content playback device 200 may also consider that an unauthorized usage of content occurred and update content protection system by requesting a second key from the server and configuring a second decrypter based on the second key. An updating process is a method of improving content protection without affecting actual playback of content and without using excessive system resources.

Figure 8:
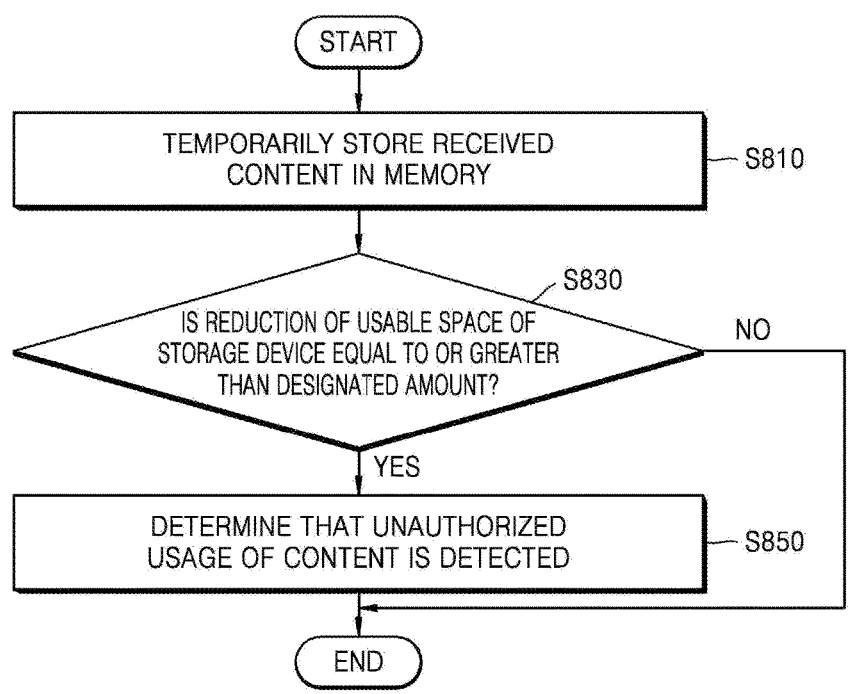
FIG. 8 is a flowchart illustrating a method of detecting unauthorized usage of content.

FIG. 8 is a flowchart illustrating an example method of detecting unauthorized usage of content.

In an example in which data received by the content playback device 200 is not stored in a storage device, in an operation S810, the content playback device 200 may receive content received from a server and temporarily store the received content in a memory.

The memory may, for example, be a volatile memory, an internal memory, an external memory, or a combination thereof. For example, the memory may be a volatile memory like a static random access memory (SRAM). Furthermore, the memory may be a volatile memory subordinated to a browser.

In an operation S830, the content playback device 200 may determine whether a reduction of the usable space of the storage device is equal to or greater than a designated amount.

In the case of an example in which data received by the content playback device 200 is temporarily stored in a memory, a usage space of the storage device should not be reduced.

Generally, in a streaming service, it is not necessary to store data. Therefore, if streaming data is stored in a physical storage device in a improper manner, it is likely that the streaming data may be maliciously used and thus the usage of the content may be determined to be unauthorized.

If a reduction of the usable space of the storage device is greater than a designated amount, the content playback device 200 may determine that an unauthorized usage of content is detected.

However, even if a reduction of the usable space of the storage device is actually greater than a designated amount, no unauthorized usage of content may have occurred.

Even in this case, the content playback device 200 may also consider that an unauthorized usage of content occurred and update content protection system by requesting a second key from the server and configuring a second decrypter based on the second key. An updating process is a method of improving content protection without affecting actual playback of content and using excessive system resources.

Figure 9:
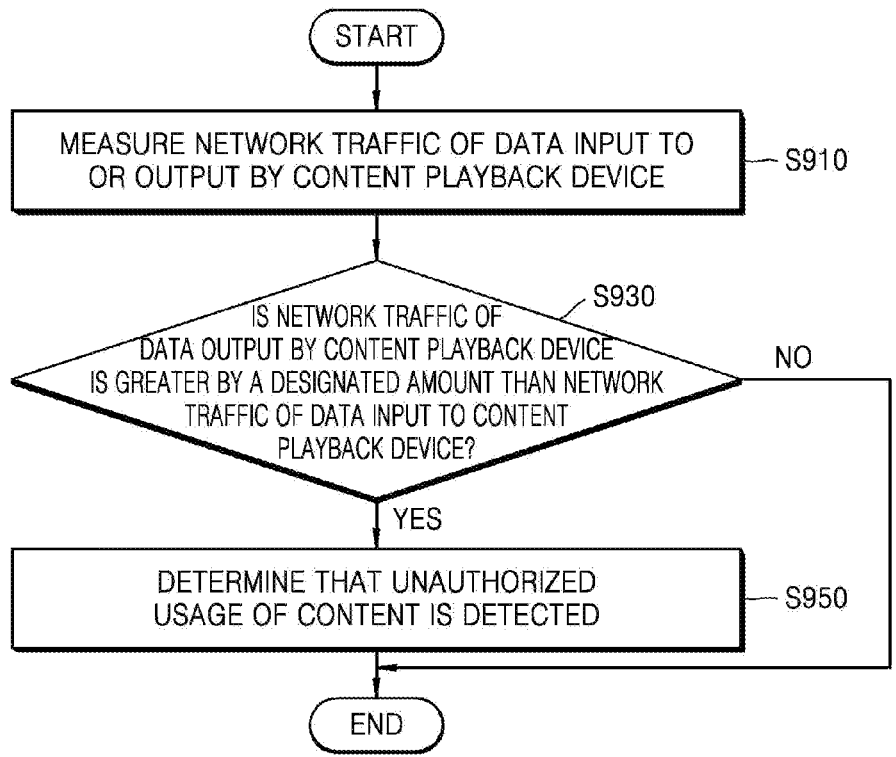
FIG. 9 is a flowchart illustrating a method of detecting unauthorized usage of content.

FIG. 9 is a flowchart illustrating an example method of detecting an unauthorized usage of content.

In an operation S910, the content playback device 200 may, for example, measure network traffic of data input to the content playback device 200 or output by the content playback device 200.

The content playback device 200 may, for example, measure network traffic in real time using various software.

In operation S930, the content playback device 200 may determine whether network traffic output from the content playback device 200 is greater by a designated amount than network traffic input to the content playback device 200.

If network traffic output from the content playback device 200 is greater by a designated amount than network traffic input to the content playback device 200, it is likely that content received by the content playback device 200 is being transmitted to an external device via a network, and thus it may be determined that unauthorized usage of the content may likely occur.

For example, if network traffic output from the content playback device 200 is greater by a designated amount than network traffic input to the content playback device 200, the content playback device 200 may determine that an unauthorized usage of content is detected (operation S950).

Figure 10:
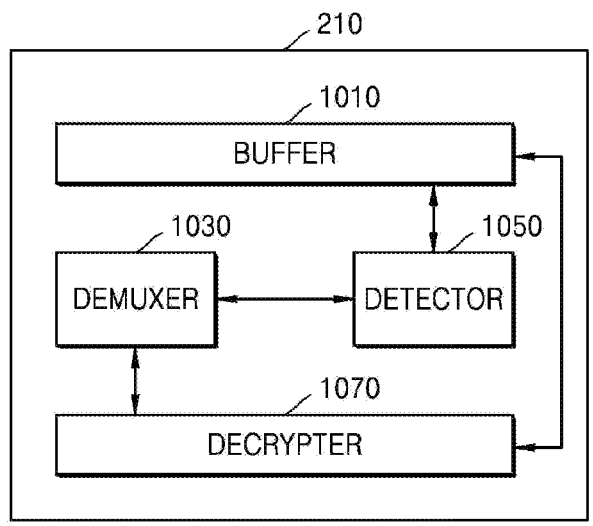
FIG. 10 is a block diagram illustrating a processor.

FIG. 10 is a diagram illustrating the processor 210.

The processor 210 may, for example, include a buffer 1010, a demuxer 1030, a detector 1050, and a decrypter 1070.

The buffer 1010 may function like a memory in the processor 210. For example, the buffer 1010 may receive content and a key from a server and temporarily store the content and the key.

The demuxer 1030 stores all necessary information for generating a key including an address of a server being accessed and information regarding a digital rights management (DRM) type and may provide necessary information when the detector 1050 requests a new key from the server.

The detector 1050 may accumulate the size of content received by the buffer 1010. Furthermore, the detector 1050 may detect unauthorized usage of content by checking a reduction of the usable space of a storage device or measuring network traffic of data output by the content playback device 200.

If an unauthorized usage of content is detected, the detector 1050 may request a new key from the server.

The decrypter 1070 may receive a key from the buffer 1010 and decrypt content.

The decrypter 1070 may exist in the form of a proxy server and may be embodied in various manners.

In the examples, the term proxy server may refer to a server that relays data between a server, the buffer 1010, and an output device, such that the output device may output decrypted content. The decrypter 1070 may store content that is received from the server or the buffer 1010 and decrypted, and, if content to be output by the output device is the content existing in the decrypter 1070, the content stored in the decrypter 1070 may be output without receiving data from the server or the buffer 1010 and decrypting the received data.

Figure 11:
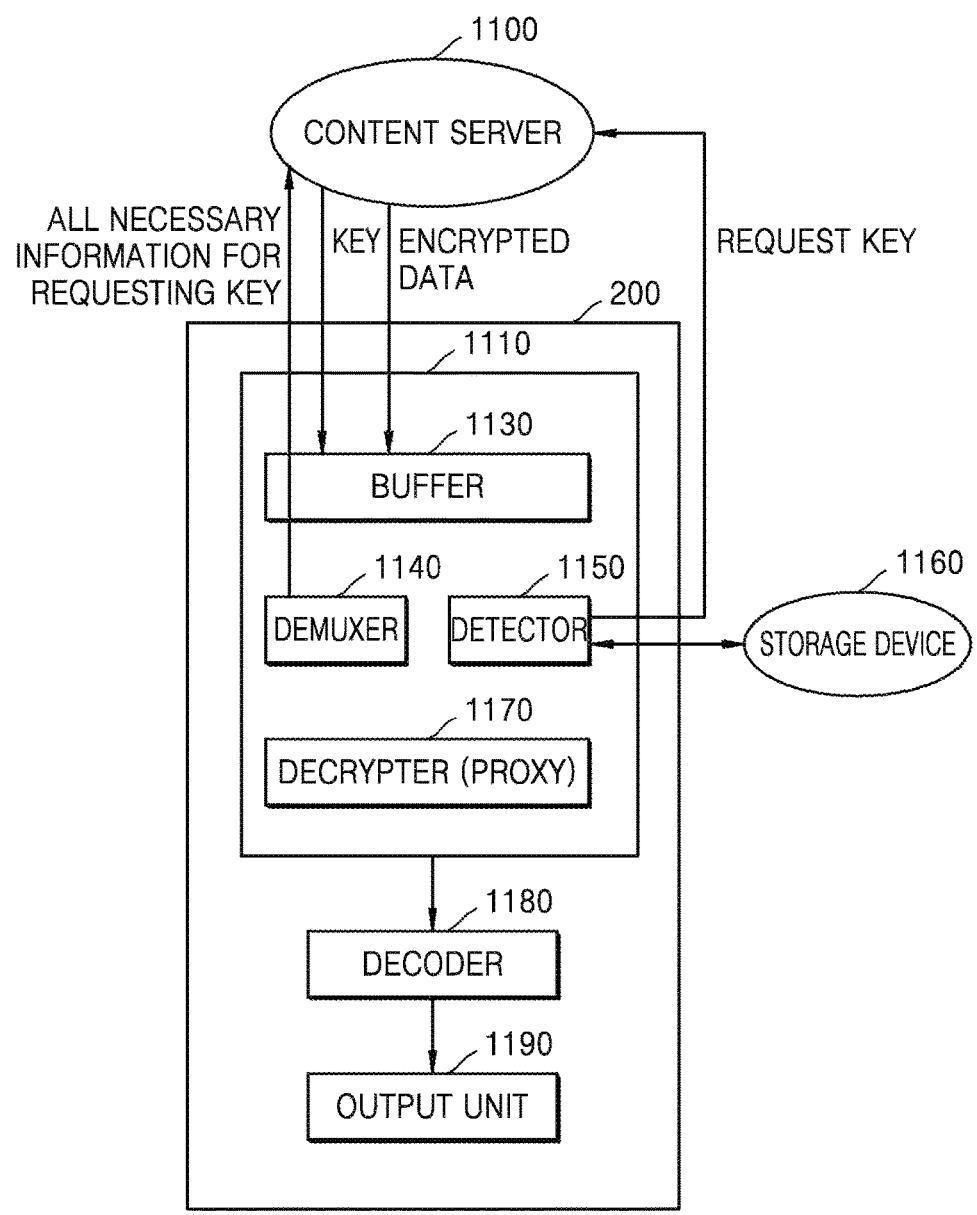
FIG. 11 is a diagram illustrating a data flow between a server and a processor.

FIG. 11 is a diagram illustrating an example data flow between a server and a processor.

A content server 1100 may, for example, be a server storing various multimedia contents and keys and may transmit content and a key to the content playback device 200 according to a request of a processor 1110.

A buffer 1130 may receive content and a key from the content server 1100 and temporarily store the received content.

A demuxer 1140 stores necessary information and may provide necessary information when a detector 1150 requests a new key from the server.

The detector 1150 may accumulate the size of content received by the buffer 1010. For example, the detector 1150 may detect an unauthorized usage of content by checking a reduction of the usable space of a storage device. If an unauthorized usage of content is detected, the detector 1150 may request a new key from the server.

A decrypter 1170 may receive a key from the processor 1110 and decrypt content. The decrypter 1170 may exist in the form of a proxy server.

A decoder 1180 may decode the received encoded content into a form to be played back with video or audio.

The output device 1190 may output decoded content to outside.

While the examples have been illustrated and described with reference to example embodiments, it will be understood by those of ordinary skill in the art that various changes in form and details may be made therein without departing from the spirit and scope of the disclosure as defined by the following claims. Hence, it will be understood that the example embodiments described above are intended to be illustrative and not limiting. For example, each component described in a single type may be executed in a distributed manner, and components described distributed may also be executed in an integrated form.

The scope of the disclosure is indicated by the claims, and it should be understood that the claims and all modifications or modified forms drawn from the claims are included in the scope of the disclosure.

What is claimed is:

1. A method of playing back streamed content in a content playback device, the method comprising:
    receiving the content streamed from a content server;
    decoding the content based on first decryption circuitry configured based on a first key and outputting the decoded content;
    monitoring a usable space of a storage device of the content playback device;
    detecting unauthorized usage of the content using a result of the monitoring of the usable space of the storage device, the detection of the unauthorized usage of the content being for requesting another key other than the first key;
    based on detecting the unauthorized usage of the content, requesting a second key, as the other key, from the content server;
    receiving the second key from the content server and configuring second decryption circuitry based on the second key; and
    based on completing of the configuring of the second decryption circuitry, deactivating the first decryption circuitry and decoding the content streamed from the content server based on the second decryption circuitry and outputting the decoded content,
    wherein detecting the unauthorized usage of the content comprises:
    calculating an accumulation amount of data which is received by the content playback device from the content server,
    calculating a decreasing amount of a usable space of the storage device, and
    detecting the unauthorized usage of the content based on a relation between the accumulation amount of data and the decreasing amount of the usable space of the storage device.

2. The method of claim 1, wherein the decoding of the content based on the first decryption circuitry and outputting of the decoded content is performed until the second decryption circuitry is configured.

3. The method of claim 1, wherein detecting the unauthorized usage of the content comprises determining that the unauthorized usage of the content is detected when the accumulation amount of data is greater than the decreasing amount of the usable space of the storage device.

4. The method of claim 1, wherein, when configuring of the second decryption circuitry is completed, the first decryption circuitry is unable to decode the content.

5. The method of claim 1, wherein decoding the content based on the first decryption circuitry, requesting of the second key from the content server, receiving of the second key from the content server, configuring the second decryption circuitry, and decoding the content based on the second decryption circuitry are performed via a web browser.

6. A content playback device for playing back streamed content, the content playback device comprising:
    a storage device configured to store the content received from the content server; and
    a processor configured to at least:

receive the content streamed from a content server;
decode the content based on first decryption circuitry configured based on a first key and output the decoded content;
monitor a usable space of the storage device;
detect unauthorized usage of the content using a result of the monitoring of the usable space of the storage device, the detection of the unauthorized usage of the content being for requesting another key other than the first key;
based on detecting the unauthorized usage of the content, request a second key, as the other key, from the content server;
receive the second key from the content server;
configure second decryption circuitry based on the second key; and
based on completing of the configuring of the second decryption circuitry, deactivate the first decryption circuitry and decode the content streamed from the content server based on the second decryption circuitry and output the decoded content,
wherein the processor is further configured to detect the unauthorized usage of the content by:
calculating an accumulation amount of data which is received by the content playback device from the content server,
calculating a decreasing amount of a usable space of the storage device, and
detecting the unauthorized usage of the content based on a relation between the accumulation amount of data and the decreasing amount of the usable space of the storage device.

7. The device of claim 6, wherein decoding the content based on the first decryption circuitry and outputting the content is performed until the second decryption circuitry is configured.

8. The device of claim 6, wherein the processor is further configured to determine that the unauthorized usage of the content is detected when the accumulation amount of data is greater than the decreasing amount of the usable space of the storage device.

9. The device of claim 6, wherein the processor is further configured to disable decoding the content based on the first decryption circuitry when the processor completes configuring the second decryption circuitry.

10. The device of claim 6, wherein the processor further comprises a demuxer configured to request the second key from the content server based on information including an address of the content server and information regarding a digital rights management (DRM).

11. A non-transitory computer readable recording medium having recorded thereon computer program code which, when executed by a processor of a content playback device, causes the content playback device to perform at least:
receiving streamed content from a content server;
decoding the content based on first decryption circuitry configured based on a first key and outputting the decoded content;
monitoring a usable space of a storage device of the content playback device;
detecting unauthorized usage of the content using a result of the monitoring of the usable space of the storage device, the detection of the unauthorized usage of the content being for requesting another key other than the first key;
based on detecting the unauthorized usage of the content, requesting a second key, as the other key, from the content server;
receiving the second key from the content server and configuring second decryption circuitry based on the second key; and
based on completing of the configuring of the second decryption circuitry, deactivating the first decrypting circuitry and decoding the content streamed from the content server based on the second decryption circuitry and outputting the decoded content,
wherein detecting the unauthorized usage of the content comprises:
calculating an accumulation amount of data which is received by the content playback device from the content server,
calculating a decreasing amount of a usable space of the storage device, and
detecting the unauthorized usage of the content based on a relation between the accumulation amount of data and the decreasing amount of the usable space of the storage device.

* * * * *